Jan. 14, 1969 P. T. BRADY 3,422,232

SPEECH PATTERN REARRANGING COMMUNICATION SYSTEM

Filed Oct. 8, 1964 Sheet 1 of 2

INVENTOR
P. T. BRADY
BY [signature]
ATTORNEY

United States Patent Office
3,422,232
Patented Jan. 14, 1969

3,422,232
SPEECH PATTERN REARRANGING COMMUNICATION SYSTEM

Paul T. Brady, Maplewood, N.J., assignor to Bell Telephone Laboratories, Incorporated, New York, N.Y., a corporation of New York Filed Oct. 8, 1964, Ser. No. 402,591
U.S. Cl. 179—170.8 9 Claims
Int. Cl. H04b *3/20*

ABSTRACT OF THE DISCLOSURE

In a communication system having two oppositely-directed one-way transmission paths and at least one two-way transmission path connected to the two-way path, an echo suppressor is provided with an auxiliary circuit that delays potentially interrupting signals from the distant party to avoid the interruption. When the local party ceases talking, the accumulated delay in the received signal is then gradually eliminated by reducing the duration of noncommunicative intervals in the signal. The delay circuit illustratively comprises a movable magnetic tape and a plurality of reproducing heads, the outputs from which are electrically scanned or sampled in a step-wise sequence in one direction to accomplish the delay and in the opposite direction to eliminate the delay. The delay circuit could also be implemented completely with electronic circuitry.

Figure 1:
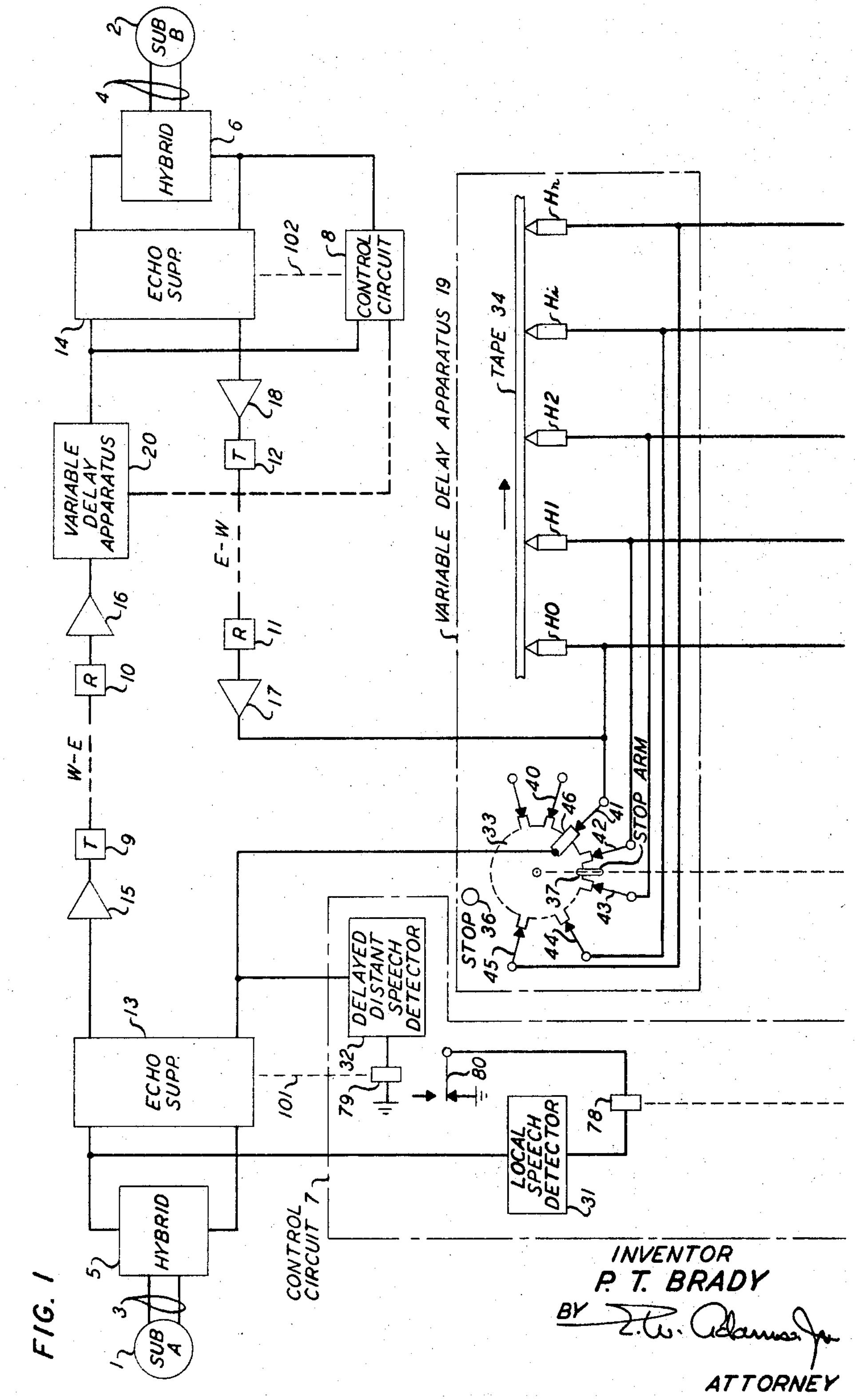

This invention relates to the suppression of echoes and the two-way interchange of information in a communication system in which two-way transmission paths are linked by paired one-way transmission paths.

Echoes occur in such a system because the circuits that connect the two-way paths to the one-way paths in any practicable circuit will inevitably permit a small portion of signals coming from one of the one-way paths to be sent back along the other one-way path. Experience has shown that such echoes must be blocked or substantially attenuated; but, if this is done, signals other than echoes may be blocked or mutilated whenever one party to a conversation interrupts the other.

The advent of satellite communication systems has made the dilemma even more severe. The transmission of signals in such a system may require 300 milliseconds or more in each direction. This transmission time may be called the transmission delay. On the one hand, an echo will disrupt a conversation to a greater extent the longer it is delayed. On the other hand, existing telephone circuit echo suppressors destroy more of the information normally exchanged in a conversation as the transmission delay increases. One reason for this is that a large number of unintentional interruptions tend to occur when the signal transmission dealy is so great. Consequently, in a satellite communication system, the echo suppressors may annoy the conversing parties and disrupt their conversation nearly as much as the echoes would.

It has become necessary to avoid both types of disruption of a conversation.

Applicant has recognized that a rapid two-way exchange of information does not require the extensive noncommunicative intervals that occur between spurts of conversational signals.

Therefore, an object of this invention is to reduce disruption of a conversation in a communication system in which two-way transmission paths are linked by paired one-way transmission paths.

Another object of this invention is to utilize noncommunicative intervals in communication signal patterns to facilitate two-way exchange of information in a communication system having substantial signal transmission delays.

According to the invention, signal patterns that might produce interruption in a two-way communication system are variably delayed in order to arrive at more appropriate times; and the accumulated delay is gradually reduced by reducing the duration of noncommunicative intervals in the delayed signal patterns.

According to a feature of the invention, a circuit is provided which can be used as an auxiliary circuit for nearly any type of echo suppressor in a communication system in which two-way transmission paths are linked by by paired one-way transmission paths.

Further features and advantages of the invention are explained in the following detailed description as illustrated by the drawing, which shows a preferred embodiment of the invention used as an auxiliary circuit for an echo suppressor.

Figures 2, 3:
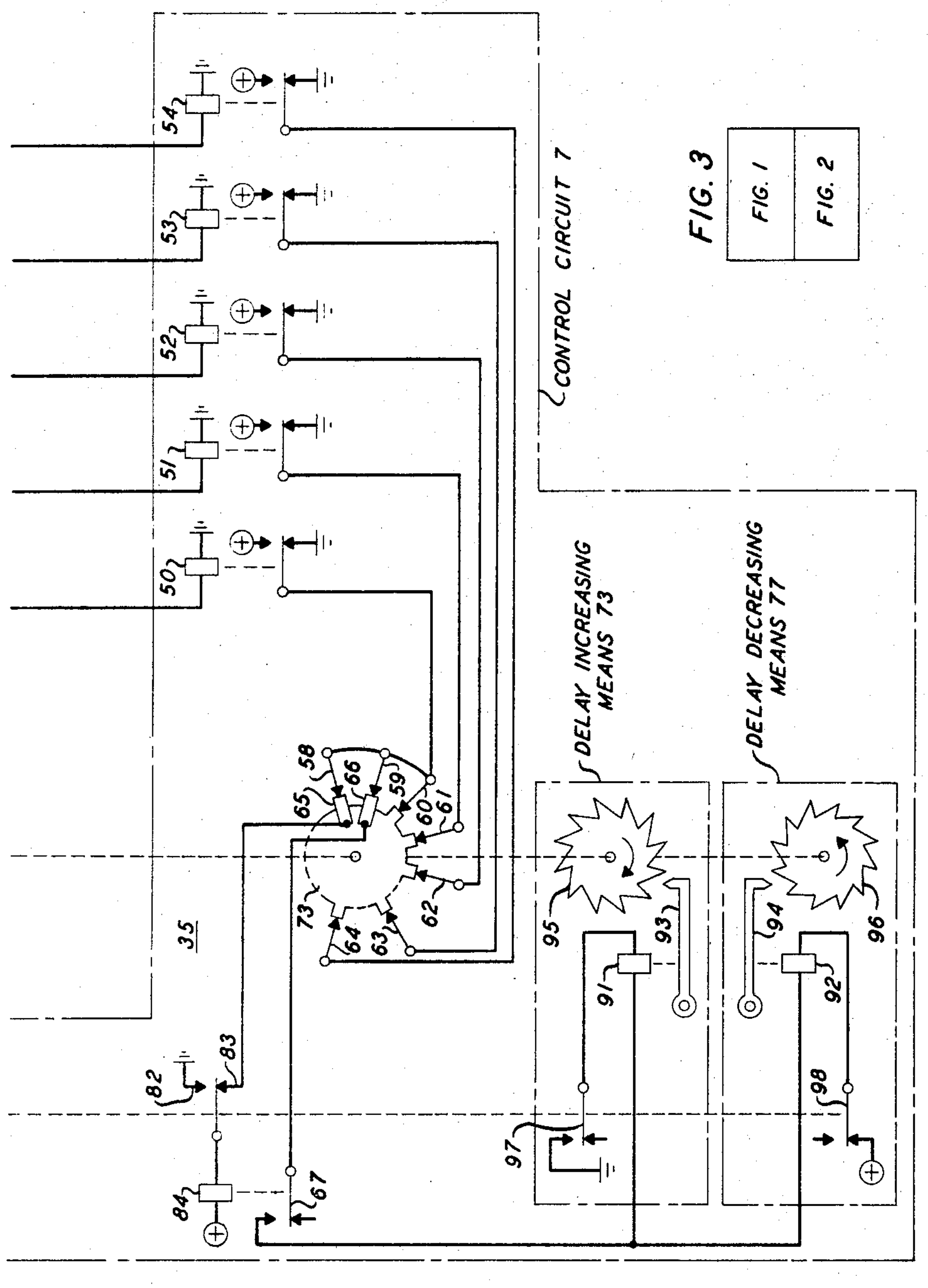

In the drawing, FIGS. 1 and 2 when placed together as indicated in FIG. 3 constitute a partially schematic and partially block diagrammatic showing of the preferred embodiment of the invention.

In FIG. 1, a local telephone apparatus 1 of a party A and a local telephone apparatus 2 of a party B are connected to the respective two-way transmission circuits 3 and 4. The local telephone apparatuses 1 and 2 may be subscriber station sets of types well-known in the art. The circuits 3 and 4 are of the type ordinarily used in the local telephone wire plant; and the W–E and E–W transmission paths may be one-way radio links, such as are used in microwave radio systems or in a satellite communication system, or may be other one-way telephone circuits having substantial transmission delays. Circuits 3 and 4 are connected to the paired one-way transmission paths W–E and E–W by apparatuses that may be called terminals.

The terminal connecting the two-way circuit 3 to the W–E and E–W paths extends from the circuit 3 through a hybrid netword 5, an echo suppressor 13, an isolation amplifier 15 and a transmitter 9 to the W–E path and from the E–W path through a receiver 11, an isolation amplifier 17, a variable delay apparatus 19, the echo suppressor 13, and the hybrid network 5 to the circuit 3.

The terminal connecting the two-way circuit 4 to the W–E and E–W paths extends from the circuit 4 through a hybrid network 6, an echo suppressor 14, an isolation amplifier 18 and a transmitter 12 to the E–W path and from the W–E path through a receiver 10, an isolation amplifier 16, a variable delay apparatus 20, the echo suppressor 14, and the hybrid network 6 to the circuit 4.

A control circuit 7 for the variable delay apparatus 19 has an input comprising a local speech detector 31 having its input connected between an output port of the hybrid network 5 and an input of the echo suppressor 13 and has another input comprising the delayed distant speech detector 32 having its input connected between an output of variable delay apparatus 19 and another input of the echo suppressor 13. A control circuit 8 in the other terminal has similar connections between the echo suppressor 14 and an output port of the hybrid network 6 and between the echo suppressor 14 and the variable delay apparatus 20, respectively. The control circuit 8 is arranged with respect to the delay apparatus 20 and the echo suppressor 14 as the control circuit 7 is arranged, as described hereinafter, with respect to the delay apparatus 19 and the echo suppressor 13.

The echo suppressors 13 and 14 may, for example, each be of the type shown in the copending application of applicant and G. K. Helder, Ser. No. 323,351, filed Nov. 13, 1963, and assigned to the assignee hereof, and incorporated by reference herein. Nevertheless, other echo suppressors may also be used. The speech detectors 31 and 32 may be the corresponding speech detectors disclosed therein. In any event. echo suppressors 13 and 14 include at least means for preventing the transmission of objectionable echoes on the respective outgoing one-way paths, viz. W–E and E–W, respectively; and speech detectors 31 and 32 and their counterparts in suppressor 14 serve to supply signals that are appropriate for operating the last-mentioned means.

The variable delay apparatus 19 is arranged and adapted as follows. The isolation amplifier 17 applies signals from the receiver 11 to a magnetic recording head $H_0$, which records them upon a moving magnetic tape 34. The isolation amplifier 17 also applies these signals to a fixed tap 41 of one deck of a rotary stepping switch 35. In the normal no-delay condition of the delay apparatus 19, a movable wiper arm 46 mounted on a rotatable wafer 33 of the stepping switch 35 contacts tap 41. Since the wiper arm 46 is connected through echo suppressor 13 to the hybrid network 5, the signals received by wiper 46 are applied to the echo suppressor and then to the hybrid network 5. If the wafer 33 carrying the wiper 46 is rotated to enable the wiper 46 to contact another fixed tap 42, the received signals recorded by the recording head $H_0$ will arrive, after 200 milliseconds, for example, at a magnetic pickup head $H_1$ via the movement of magnetic tape 34, and will be applied to fixed tap 42, then wiper 46, from whence the signals will finally arrive at hybrid network 5.

Thus, by stepping the wiper 46 clockwise, that is, in a direction to pick up signals a longer time after their recording on tape 34, the delay encountered by communication signals before arriving at hybrid network 5 may be increased stepwise; and by stepping the wiper 46 counterclockwise, providing it is not already in its normal condition, the delay encountered by the signals may be decreased stepwise. That is, signals will be picked up a shorter time after recording on the tape 34. For practical reasons, the maximum delay should be limited to about fixe seconds. Preferably, the recording and pickup heads are spaced so that each point on the magnetic tape 34 takes about 200 milliseconds to traverse the distance between adjacent heads.

In the control circuit 7, a speech detecting circuit including a relay 50 is connected to the output of the isolation amplifier 17; and other speech detecting circuits respectively including other relays 51 through 54 are connected to the magnetic pickup heads $H_1$, $H_2$, $H_i$ and $H_n$, respectively. It is noted that the subscripts "$i$" and "$n$" are used for generality, since the invention will ordinarily use a large number of steps of delay, as shown by the dotted portions of rotatable wafers 33 and 73 on stepping switch 35. Thus, "$i$" refers to any selected pickup head or speech detector, or the corresponding amount of transmission delay; and "$n$" refers to the last one. Each speech detecting circuit will ordinarily include a conventional buffer amplifier and a conventional rectifier-detector, not shown, in addition to the relay shown. In such circuits, the buffer amplifier provides isolation between the signal source and the input of a rectifier, the output of which drives the relay. Whenever any of the relays 50 through 54 is not operated, that is, whenever no speech signal is picked up by the corresponding pickup head, the respective controlled contacts of that relay apply ground potential to the respective one of the fixed taps 60 through 64 on a second deck of rotary stepping switch 35. Whenever any of the relays 50 through 54 are operated the respective controlled contacts apply a fixed positive potential to the respective one of the fixed taps 60 through 64.

A control wafer 73, which is the second deck of the rotatable part of rotary stepping switch 35, bears the control wipers 65 and 66. For purposes of contrast, wafer 33 will be called the voice wafer, although the communication signals are not limited to voice signals. Control wafer 73 is ganged with voice wafer 33 so that in the normal no-delay condition of delay apparatus 19, the wipers 66 and 65 contact the fixed taps 59 and 58, respectively, which are both connected to the fixed tap 60.

In general, whenever the voice wiper 46 is effectively connected to the "$i$th" pickup head, the potentials applied to wipers 66 and 65 are respectively controlled by the $i-1$)th speech detector relay and the $(i-2)$th speech detector relay or by the speech detector relay 50 whenever the speech detector relays specified by the above formulas do not exist.

The control circuit 7 further includes means 73 for increasing the delay, means 77 for decreasing the delay, and various other circuits that determine when the delay should be increased or decreased.

Accordingly, whenever party A is talking and no signals from party B have been detected by the detector 32, the detector 31 applies an actuating voltage to a relay armature 78 by the indicated connection through the normally closed contacts 80. The armature 78 closes its controlled contacts 82 and 97 while opening its controlled contacts 83 and 98. The closing of the contacts 82 applies operating voltage through appropriate connections to a relay armature 84, which closes its controlled contacts 67. A relay armature 91 in the delay increasing means 76 is now prepared to operate a driving ratchet 93 whenever a potential other than ground potential appears on the control wiper 66.

If interrupting signals from party B are now received by receiver 11, amplifier 17 applies operating voltage to the speech detecting relay 50, which breaks its ground contacts and applies a nonground potential to the fixed taps 58, 59 and 60 and to the wiper 66. The relay armature 91 operates the driving ratchet 93 to advance a ratchet wheel 95 one notch. The ratchet wheel 95 is ganged with the wafers 33 and 73, and therefore advances the voice wiper 46 to the fixed tap 42 and advances the control wiper 66 to the fixed tap 60. The voice wiper 46 is now connected to a pickup $H_1$ which will be reached in about 200 milliseconds by the part of tape 34 that carries the beginning of the communication signal recorded by pickup head, $H_0$. The relay armature 91 is released as wiper 66 passes between the taps 59 and 60 and then is immediately reoperated upon receiving positive voltage from the fixed tap 60. The ratchet wheel 95 is accordingly advanced another notch.

The voice wiper 46 is now at the tap 43, connected to pickup head $H_2$, which will be reached in about 400 milliseconds by the portion of tape 34 carrying the beginning of the recorded voice signal. In the meantime, the wiper 66 receives ground potential from the tap 61. After 200 milliseconds, the moving magnetic tape 34 has advanced the voice signal to the pickup head $H_1$; and the relay 51 operates to place a positive potential on the tap 61. The ratchet wheel 95 will be advanced yet another notch. Consequently, voice wiper 46 remains effectively 200–400 milliseconds ahead of the advancing voice signal after leaving its normal position, although A may receive a short blip of voice signal before wiper 46 leaves tap 41. This blip may be minimized by using a very high speed rotary stepping switch for stepping switch 35 and very high speed relays for relays 50 through 54. Clicks in the voice path may be avoided by adapting wiper 46 so that it will bridge adjacent taps, e.g., 41 and 42, as it moves from tap to tap.

B's delayed voice signals may now exit from delay apparatus 19 upon the occurrence of either of two conditions. First, A may stop talking for a longer period than the hangover time of relay armature 78, which may be for example, 450 milliseconds, or preferably an experimentally determined time that permits the prediction that B's interrupting signals may be fitted into the ensuing pause. The armature 78 will release. Its controlled contacts 97 and 82 will open; and its controlled contacts 83 and 98 close.

Second, B's signals may traverse the entire delay available on tape 34, be picked up the last pickup head $H_n$ and applied to voice wiper 46 which is contacting tap 45 at this time and is prevented from advancing farther because stop arm 37 is against stop 36. The speech detector 32 detects the signal applied to wiper 46 and, through appropriate connections, operates relay armature 79 to open contacts 80. The relay armature 78 will release, producing the same results in the control circuit 7 as when A stops talking.

The delay-decreasing means 77 is now in control of the delay apparatus 19, and will reduce the delay of B's speech signals by reducing the duration of noncommunicative intervals therein. This objective is accomplished by the following arrangement and adaptation of delay-decreasing means 77.

In every position of the rotary stepping switch 35, control wipers 66 and 65 make contact with fixed taps having potentials controlled by speech detectors that receive the signal recorded on tape 34 with 200 milliseconds and 400 milliseconds less delay respectively than does the pickup head connected to the fixed tap contacted by wiper 46.

Wiper 65 is connected through the presently closed contacts 83 to the relay armature 84, which is then energized in response to ground potential that may appear on wiper 65 during relatively long pauses in A's speech signals. The armature 84 will then close contacts 67. The wiper 66 is connected through contacts 67 to armature 92, which is connected through the presently closed contacts 98 to positive potential and is energized in response to ground potential that may also appear on the control wiper 66 during the pause in A's speech signal.

Speech detector relays 50 through 54 have a slow-release time, or hangover, of about 220 milliseconds and a fast-operate time of only a few milliseconds. Consequently, ground potential can appear on both wipers 65 and 66 only when the noncommunicative interval recorded on tape 34 is 420 milliseconds long or longer. That is, the signals last preceding the interval have required 200 milliseconds to travel between the pickup heads temporarily associated with wipers 65 and 66; and then the speech detector associated with wiper 66 has required 220 milliseconds to release, so that the last recorded signals preceding the interval occupy a portion of tape 34 which has already passed the pickup head temporarily associated with voice wiper 46. Then, the relay armature 92 operates a driving ratch 94 to turn a ratchet wheel 96, which steps wipers 46, 66 and 65 one tap counterclockwise to decrease the accumulated delay. The energizing circuit for armature 92 is broken as wiper 66 passes between taps. Wiper 46 is now positioned to receive signals from tape 34 with 200 milliseconds less delay than before. The stepping will continue until wiper 65 is stepped to a tap having a potential controlled by a speech detector connected to a pickup head that is receiving signals. Then, wiper 65 receives positive potential; and armature 84 is de-energized and opens its controlled contacts 67. Armature 92 is then de-energized. Signals could not have existed at this pickup head more than 200 milliseconds previously, since signals would have reached the next pickup head before stepping could occur and the step would not have occurred. Under the conditions that have reduced the noncommunicative interval to the lowest possible value, recorded signals will be just approaching the pickup head connected to the speech detector that controls the potential of the tap contacted by control wiper 66; and these signals will still be at least 200 milliseconds away from the pickup head connected to voice wiper 46. Since the last preceding recorded signals passed through wiper 46 at least 20 milliseconds previously, a noncommunicative interval of the delayed signals issuing from delay apparatus 19 can not be reduced to less than 220 milliseconds, except for the last step that moves wiper 46 to tap 41, at which time wipers 65 and 66 can not anticipate the arrival of signals at pickup head $H_0$. Its greatest possible length is just less than 420 milliseconds. This residual interval maintains the intelligibility of the speech signal.

Delay speech detector 32 and relay armature 79 together have a slow-release time, or hangover, of 450 milliseconds. This hangover prevents a reversion to a delay. increasing mode during any residual nonsignal interval that can issue from delay apparatus 19 while control circuit 7 is decreasing the delay. Since any nonsignal interval that initially has a duration greater than 420 milliseconds will be reduced to a duration less than 420 milliseconds so long as accumulated delay exists in apparatus 19, it is impossible for party A to gain control of control circuitry 7 to increase the delay of apparatus 19 until the accumulated delay has been entired removed.

A circuit according to the invention is preferably used with an echo suppressor. A control connection 101 is symbolically shown between relay armature 79 and echo suppressor 13, whereby control circuit 7 and variable delay apparatus 19 may facilitate the operation of echo suppressor 13. Additional interconnections may be used, as shown in the above-cited copending application of applicant and G. K. Helder. A similar control connection 102 is shown between control circuitry 8 and echo suppressor 14.

It is also noted that a circuit according to the invention can be economically used as an auxiliary circuit for existing types of telephone circuit echo suppressors to adapt them for use in long-delay communication systems such as satellite communication systems.

Many modifications of the present invention are possible. For example, the control wafer 73 and its associated deck of the stepping switch 35 and the ratchet mechanisms could be replaced with a reversible electronic ring counter. The voice wafer 33 and its associated deck of stepping switch 35 and the remaining relay armatures and controlled contacts could be replaced with transistor switches, or similar electronic switching devices. The switches in the voice paths would require low conduction impedance and should produce very little thermal noise and clicks in the voice paths.

What is claimed is:

1. In a communication system having two oppositely-directed one-way transmission paths and a two-way transmission path coupled to said one-way paths, means for reducing simultaneous presence of signals directed in both directions in said two-way path comprising means for delaying signals in the one of said one-way paths directed toward said two-way path, said delaying means having a variable delay, means for increasing said delay in response to signals in said other path, and means for decreasing said delay as signals issue from said delaying means, said decreasing means including means for reducing non-communcative intervals in signals issuing from said delaying means.

2. In a two-way communication system, first and second terminals, a first one-way transmission path extending from said first terminal to said second terminal and having substantial transmission delay, a second one-way transmission path extending from said second terminal to said first terminal and having substantial transmission delay, said first and second terminals respectively including first and second variable delay apparatuses interposed in said second and first transmission paths respectively, first and second means responsive to the presence of signals in said first and second transmission paths respectively for increasing the delay of said first and second apparatuses respectively, and first and second means responsive to the cessation of signals in said first and second transmission paths respectively for reducing the duration of noncommunicative intervals in signals issuing from said first and second delay apparatuses, respectively.

3. A two-way communication system comprising first and second two-way telephone circuits, a first one-way transmission path coupled from said first two-way telephone circuit to said second two-way telephone circuit and having a first inherent transmission delay, a first controllable transmission delay element connected in said first path, a second one-way transmission path coupled from said second two-way telephone circuit to said first two-way telephone circuit and having a second inherent transmission delay, a second controllable transmission delay element connected in said second path, said first and second controllable transmission delay elements each being positioned between one of said inherent delays and one of said telephone circuits receiving signals through said one inherent delay, and first and second respective means for controlling said first and second controllable delay elements, said first and second controlling means each comprising means for recording signals arriving at the respective controllable delay element, a plurality of means for reproducing said signals at a plurality of intervals after recording, a first speech detector connected to detect signals transmitted from said one telephone circuit, a second speech detector connected to detect signals issuing from said respective controllable delay element, said respective controllable delay element including a switching arrangement capable of connecting one of said reproducing means as an output of said respective controllable delay element, a control circuit responsive to said first and second detectors and enabled to control said switching arrangement in a delay-increasing mode whenever speech signals are detected by said first detector but not by said second detector provided said controllable delay element can have a greater delay, said control circuit being enabled to control said switching arrangement in a delay-decreasing mode whenever not enabled in said delay-increasing mode, a plurality of additional speech detectors each responsive to a respective one of said reproducing means, said additional speech detectors being connected to said control circuit to energize said enabled control circuit whenever said control circuit is in the delay-increasing mode and recorded signals are present at one of said reproducing means preceding said reproducing means that is connected as the output of said respective controllable delay element, said additional speech detectors being adapted to energize said enabled control circuit whenever said control circuit is in the delay-decreasing mode and recorded signals are absent at said output reproducing means and absent at said plurality of reproducing means immediately preceding said output reproducing means, whereby the duration of absence of said signals at said output reproducing can be maintained less than a maximum duration and more than a minimum duration while the delay provided by said controllable delay element is being decreased.

4. A two-way communication system according to claim 3 including a first echo suppressor arrangement coupled to said one-way transmission paths at first and second points respectively following said first controllable delay element and preceding said second inherent delay, the first means for controlling said first controllable delay element being coupled with said first echo suppressor arrangement, and a second echo suppressor arrangement coupled to said one-way transmission paths at third and fourth points respectively following said second controllable delay element and preceding said first inherent delay, the second means for controlling said second controllable delay element being coupled with said second echo suppressor arrangement.

5. A two-way communication system according to claim 3 in which the switching arrangements in the first and second controlling means each comprise a rotary stepping switch having a first set of taps and a first wiper connecting one of the reproducing means as the output of the respective controllable delay and having a second set of taps and a second set of wipers connected to respond to the plurality of speech detectors that are responsive to the plurality of reproducing means immediately preceding said output reproducing means, each of said first set of taps being connected to one of said recording and reproducing means, and each of said second set of taps being responsively coupled to one of the additional speech detectors.

6. A two-way communication system comprising first and second two-way telephone circuits, a first one-way transmission path comprising a first radio link including a transmitting terminal coupled to said first two-way telephone circuit and a receiving terminal coupled to said second two-way telephone circuit, said first transmission path including a first variable transmission delay, a second one-way transmission path comprising a second radio link including a transmitting terminal coupled to said second two-way telephone circiut and a receiving terminal coupled to said first two-way telephone circuit, said second transmission path having a second variable transmission delay, means for suppressing echoes in said first and second one-way transmission paths, and first and second means associated with said first and second telephone circuits respectively for varying said second and first transmission delays respectively, said first and second delay varying means each including means for recording received signals, a plurality of means for reproducing said signals at a plurality of different delay intervals after recording, and means for selecting one of said reproducing means to supply said received signals to said two-way telephone circuit coupled to said receiving terminal, said selecting means being adapted to step between said reproducing means in a direction to increase the delay during a first set of conditions and to step between said reproducing means in a direction to reduce said delay during a second set of conditions.

7. A communication system according to claim 6 in which the selecting means in each of the first and second delay-varying means includes a first speech detector having an input connected between one of said two-way telephone circuits and the respective transmitting terminal and having an output, a second speech detector having an input connected between the respective variable delay and said one two-way circuit and having an output, the selecting means including a stepping switch arrangement and a first gating circuit coupled to said first and second detector outputs and arranged to enable said stepping switch arrangement in a delay-increasing mode whenever detected speech signals are present at said first detector output and absent from said second detector output provided the variable delay has not reached a maximum value, a plurality of additional speech detectors responsive to respective ones of said reproducing means to energize said enabled stepping switch in said delay-increasing mode whenever recorded signals arrive at a reproducing means preceding the reproducing means selected to supply received signals to the two-way telephone circuit, said first gating circuit being adapted to enable said stepping switch arrangement in a delay-decreasing mode whenever not enabled in a delay-increasing mode, and a second gating circuit coupled to at least the reproducing means preceding said selected reproducing means and arranged to energize said stepping switch arrangement whenever enabled in said delay-decreasing mode in response to absences of recorded signals at said preceding reproducing means.

8. A communication system according to claim 7 in which the second gating circuit is arranged and adapted to energize said stepping switch arrangement in said delay decreasing mode whenever there is an absence of recorded signals at the selected reproducing means, the preceding reproducing means, and another of the reproducing means preceding said selected reproducing means.

9. A communication system according to claim 7 in which the absence of signals at the selected reproducing means is determined by the absence of signals at one of said preceding reproducing means for a time period equal to the delay between said selected reproducing means and said one preceding reproducing means, said additional speech detectors having a slow-release characteristic that facilitates the determination.

References Cited

UNITED STATES PATENTS

| | | | |
|---|---|---|---|
| 2,212,960 | 8/1940 | Schott | 179—170.8 |
| 2,248,746 | 7/1941 | Davis | 179—170.8 |
| 2,379,768 | 7/1945 | Van Wymen | 179—170.8 |

KATHLEEN H. CLAFFY, *Primary Examiner.*

A. H. GESS, *Assistant Examiner.*

U.S. Cl. X.R.

179—170.6